United States Patent [19]

Harwood et al.

[11] Patent Number: 4,888,599

[45] Date of Patent: Dec. 19, 1989

[54] REAL TIME APPARATUS FOR ADJUSTING CONTRAST RATIO OF LIQUID CRYSTAL DISPLAYS

[75] Inventors: Craig E. Harwood; Lyle R. Strathman, both of Cedar Rapids, Iowa

[73] Assignee: Rockwell International Corp., Cedar Rapids, Iowa

[21] Appl. No.: 113,034

[22] Filed: Oct. 22, 1987

[51] Int. Cl.[4] .............................................. G09G 3/00
[52] U.S. Cl. .................................................... 340/812
[58] Field of Search ............... 340/765, 784, 811, 812, 340/813, 793, 805; 350/331 T, 351, 336

[56] References Cited

U.S. PATENT DOCUMENTS

| | | | |
|---|---|---|---|
| 3,742,483 | 6/1973 | Ogle | 340/793 |
| 3,849,979 | 11/1974 | Tanji | 340/793 |
| 3,907,405 | 9/1975 | Fukai et al. | 340/784 |
| 4,037,931 | 7/1977 | Ido et al. | 340/784 |
| 4,104,627 | 1/1978 | Thuler | 340/811 |
| 4,114,366 | 9/1978 | Renner et al. | 340/813 |
| 4,119,842 | 10/1978 | Hayden et al. | 350/331 T |
| 4,119,845 | 10/1978 | Jaskolski et al. | 350/351 |
| 4,242,679 | 12/1980 | Morozumi et al. | 340/813 |
| 4,298,866 | 11/1981 | Hodemaekers | 340/784 |
| 4,319,237 | 3/1982 | Matsuo et al. | 340/784 |
| 4,387,963 | 6/1983 | Brennan | 350/331 T |
| 4,514,727 | 4/1985 | Van Antwerp | 340/812 |
| 4,556,876 | 12/1985 | Shimizu et al. | 340/812 |
| 4,745,403 | 5/1988 | Tamura | 340/805 |
| 4,795,238 | 1/1989 | Iizuka et al. | 350/336 |

FOREIGN PATENT DOCUMENTS

| | | | |
|---|---|---|---|
| 0039523 | 4/1981 | Japan | 350/331 T |
| 0047933 | 3/1986 | Japan | 350/331 T |

Primary Examiner—Gerald Brigance
Assistant Examiner—Richard Hjerpe
Attorney, Agent, or Firm—G. G. Williams

[57] ABSTRACT

Method and apparatus for manipulating the gray scale voltage levels in liquid crystal displays, in order to provide for enhanced image quality, over temperature extremes by monitoring the actual transmittance through the liquid crystal over time and comparing the information with earlier information.

4 Claims, 2 Drawing Sheets

REAL TIME APPARATUS FOR ADJUSTING CONTRAST RATIO OF LIQUID CRYSTAL DISPLAYS

BACKGROUND OF THE INVENTION

The present invention generally relates to optical displays, and more particularly, is concerned with liquid crystal displays, and even more particularly relates to a method and apparatus for adjusting the liquid crystal transmittance over temperature extremes and ambient light extremes in real time for use in gray scaling for liquid crystal displays.

In today's aviation industry, it is common for a single aircraft to be subjected to several extreme thermal conditions in a relatively short time interval. It is not uncommon for an aircraft to be operated with internal avionics equipment having dynamic temperature ranges of more than 70° C. With the current aspirations for trans-atmospheric aircraft, these extreme vicissitudes in the ambient temperature will continue to confront avionics engineers with perplexing problems of increasing difficulty and importance.

One particular problem that is exacerbated by these temperature oscillations is the continual change of contrast and brightness of liquid crystal displays during take-off and landing of an airplane. Typically, the transmittance versus voltage curve of a particular liquid crystal is a function of liquid crystal temperature and, to some degree, a function of the liquid crystal age. The transmittance versus voltage curve characteristics for liquid crystal is extremely important when grey scaling is attempted. The voltage across the liquid crystal, which is necessary to produce a predetermined level of transmittance of light through the liquid crystal, can vary widely over the typical operating temperature range of a display. This creates a situation where the contrast and brightness of the display are constantly changing, with a concomitant loss of information which is provided by the gray scale.

One method to control the brightness of a display is disclosed in U.S. Pat. No. 4,114,366 to Carl H. Renner et al entitled "Digital Brightness Control", which is incorporated herein by this reference. This brightness control system provides for a light sensor which measures the ambient light intensity and generates an analog signal to regulate a display.

While this method can assist in controlling the brightness of a display it suffers from serious drawbacks. The predominant drawback of such a brightness control system is that the brightness of a display is a function of the sensed ambient light intensity, and there is no control over the varying light transmittance through the liquid crystal at a given voltage as a function of temperature, and therefore does not eliminate the loss of gray scale information.

Consequently, a need exists for an improved method and apparatus for controlling the brightness and contrast of a liquid crystal display over a wide range of temperatures.

SUMMARY OF THE INVENTION

It is an object of the present invention to provide a display with improved gray scaling capability over a wide temperature range.

It is a feature of the present invention to include a light sensor which monitors the actual transmittance of light through a liquid crystal together as a function of the voltage across the liquid crystal.

It is an advantage of the present invention to achieve greater control over the gray scaling capabilities of a liquid crystal display which operates in a wide temperature environment.

The present invention provides a method and apparatus for controlling the liquid crystal transmittance over temperature and ambient light extremes for a liquid crystal display which is designed to satisfy the aforementioned needs, provide the previously propounded objects, include the above described features and achieve the earlier articulated advantages. The invention embodies a direct parameter monitoring function in the sense that the transmittance through the liquid crystal, as a function of voltage, is continuously determined and compared over time to determine any variations in the transmittance and voltage characteristic.

Accordingly, the present invention relates to a light sensor for sensing the actual light transmitted through the liquid crystal and a microprocessor comparitor for monitoring and comparing the transmittance versus voltage characteristics in a real time application.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
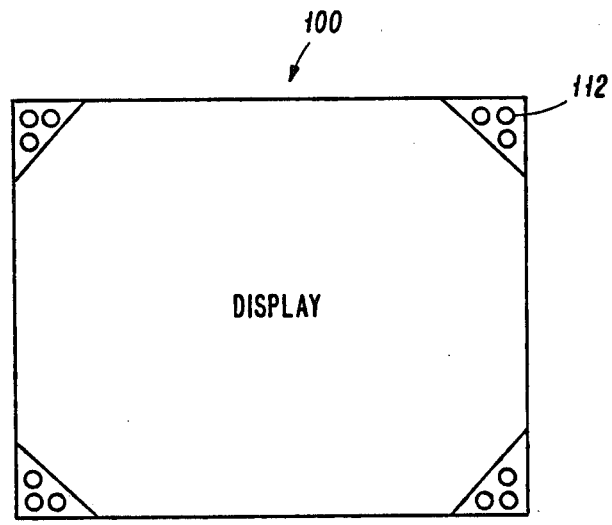
FIG. 1 is a schematic representation of a display system which shows the positioning of several light sensors in the corners of the display.

Now referring to the drawings, and more particularly to FIG. 1, there is shown a display device, generally designated 100 which hereinafter will be described as a liquid crystal display, but any display which has a brightness versus voltage output as a function of temperature, such as thin film electroluminescence displays are also contemplated. In the preferred design of the present invention, which utilizes a liquid crystal display, the light sensors 112 are placed in the corners of the display where they are able to measure the relative brightness which is attenuated by the liquid crystal during its actual use. In General, each sensor looks through the liquid crystal display at a known light source not shown. This allows operation in all ambient light levels. The output of the sensors which correspond to the light transmittance of the liquid crystal as if it is operated with varying voltages which are intentionally developed at the corners for this monitoring function. This approach will enhance the predictability of the voltage required to obtain different gray scale levels.

Figure 2:
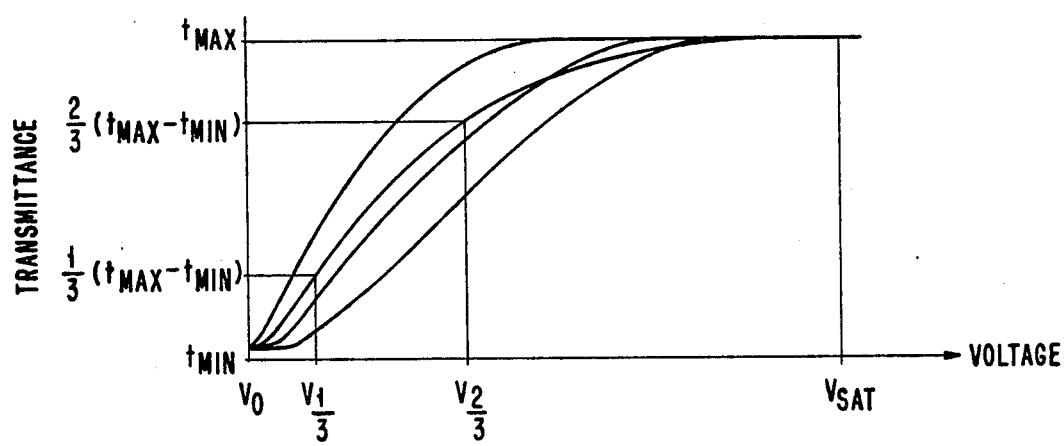
FIG. 2 is a graphic representation of a typical transmittance versus voltage graph for a particular liquid crystal with the several graphed lines representing the transmittance versus voltage characteristics at several different but constant temperatures.

Now referring to FIG. 2 there is shown a series of transmittance versus voltage curves for a given liquid crystal display where each curve represents a different liquid crystal temperature. It can be readily seen that the voltage across the liquid crystal which is necessary to produce a certain predetermined transmittance level varies greatly depending upon the liquid crystal temperature.

Figure 3:
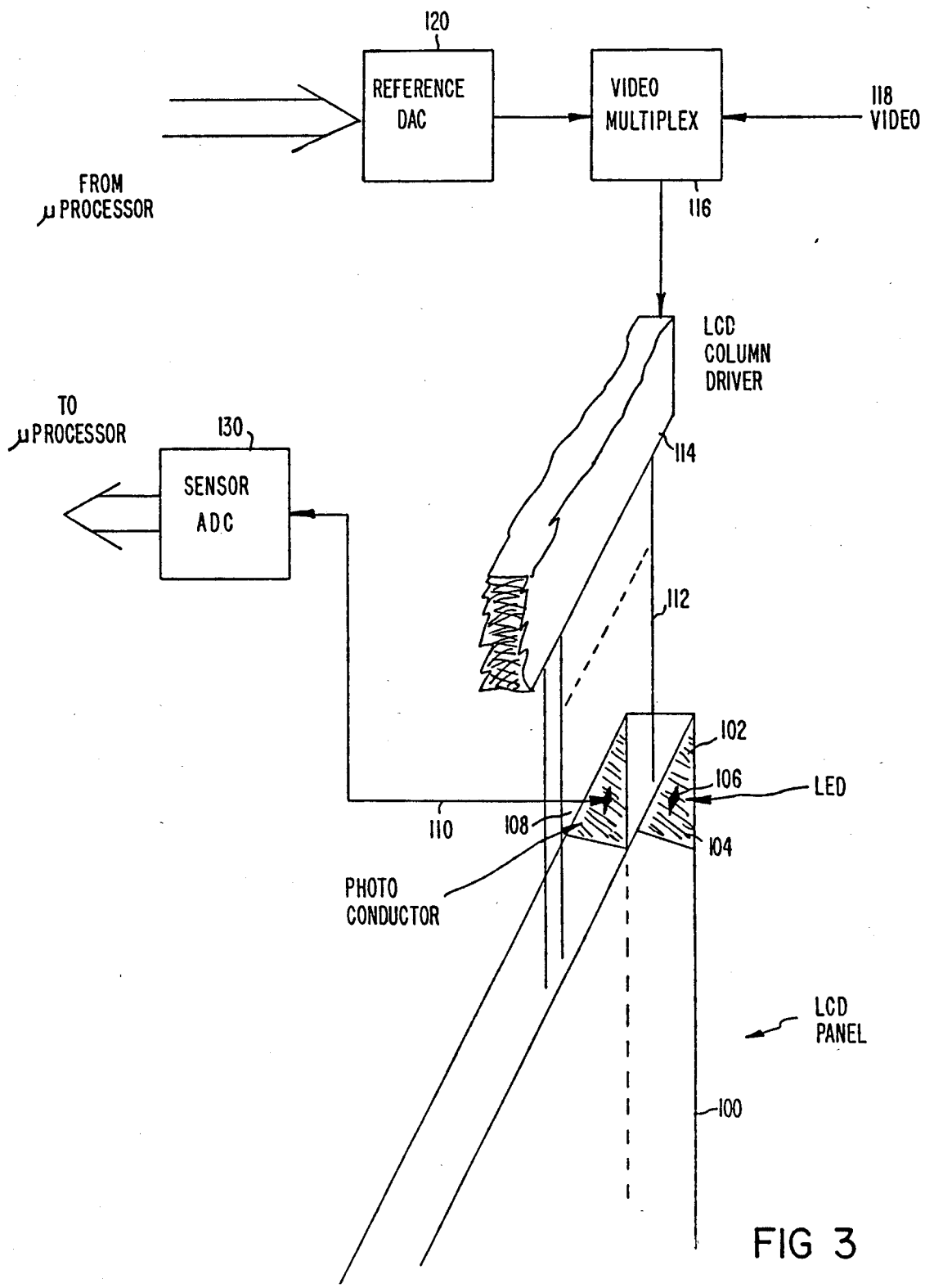
FIG. 3 is a schematic representation of a block diagram of a logic circuit of the present invention which provides for the monitoring and comparing over time of the actual light transmittance through the liquid crystal as a function of voltage.

Now referring to FIG. 3 there is shown an apparatus of the present invention which includes a liquid crystal display panel 100 having a first corner 102 with light shielding material 104 disposed thereabouts for shielding light generated therein from the viewer. A light emitting diode 106 for generating a light to be transmitted through the liquid crystal is positioned on a first surface of the liquid crystal display panel 100 while on the opposite surface is located a photo conductor 108 which is connected by line 110 to sensor 130. A microprocessor, not shown, is used to control reference digital analog converter 120 for generating a varying voltage signal for manipulating the liquid crystal which is input into the video multiplexer 116 where a video signal 118 is combined before being output to the liquid crystal display column driver 114 which performs the function of delivering the variable voltages for manipulating the liquid crystal, and is coupled with the LCD panel 100 by connectors 112.

In operation, the microprocessor, in combination with the video multiplexer and the LCD column drivers develop a series of different voltages across the liquid crystal display panel. The photo conductor 108 measures the actual light transmittance from the light emitting diode 106 which is transmitted through the liquid crystal display panel 100. The photo conductor signal for each of the varying voltage levels is monitored and compared by the microprocessor and sensor 130 so that a determination of the actual transmittance versus voltage characteristic is determined in real time. As the temperature of the liquid crystal display panel 100 changes, the transmittance through the liquid crystal of the light produced by the light emitting diode will produce variable signals by the photo conductor 108. This information is utilized by the microprocessor to determine the actual transmittance to voltage characteristic for the liquid crystal display panel at any given time and is utilized therein for setting the voltage levels for the gray scale.

It is thought that the real time method and apparatus for adjusting contrast ratios of liquid crystal displays of the present invention and many of its intended advantages will be understood from the foregoing description, and it will be apparent that various changes may be made in the form, construction, and arrangement of the parts thereof without departing from the spirit and scope of the invention, or sacrificing all of their material advantages, the forms hereinbefore described being merely preferred or exemplary embodiments thereof. It is the intention of the appended claims to cover all such changes.

We claim:

1. An apparatus for improving the image quality of a liquid crystal panel which operates in environments having temperature variations and which uses a plurality of gray scales, comprising:
   a. means for producing a predetermined light level through the liquid crystal panel;
   b. means for sensing, at a point on the liquid crystal panel, the intensity of said predetermined light level which is transmitted through the liquid crystal panel;
   c. means for manipulating the voltage across the liquid crystal panel to produce a plurality of gray scales;
   d. means for monitoring the light transmitted through the liquid crystal panel as a function of the voltage across the panel and producing a realtime transmittance output signal; and
   e. means for manipulating the gray scale levels in direct response to said output signal.

2. An apparatus of claim 1 wherein the means for producing a predetermined light level further comprises a light emitting diode disposed on a first surface of the liquid crystal panel.

3. An apparatus of claim 2 wherein the means for sensing the light transmitted through the liquid crystal panel further comprises a photo diode disposed on the opposite side of the panel with respect to the light emitting diode.

4. An apparatus of claim 3 wherein the means for manipulating the voltage across the liquid crystal panel further comprises:
   a. means for generating a series of different voltages across the liquid crystal panel for producing different transmittance levels through the liquid crystal panel.

* * * * *